(12) United States Patent
Sekine et al.

(10) Patent No.: US 11,981,823 B2
(45) Date of Patent: May 14, 2024

(54) RADIATION-CURABLE INK JET COMPOSITION AND INK JET METHOD

(71) Applicant: Seiko Epson Corporation, Tokyo (JP)

(72) Inventors: Midori Sekine, Matsumoto (JP);
Kyohei Tanaka, Matsumoto (JP);
Keitaro Nakano, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 16/902,376

(22) Filed: Jun. 16, 2020

(65) Prior Publication Data
US 2020/0392357 A1    Dec. 17, 2020

(30) Foreign Application Priority Data

Jun. 17, 2019   (JP) ................................ 2019-111787

(51) Int. Cl.
*C09D 11/101*   (2014.01)
*B41J 2/21*     (2006.01)
(Continued)

(52) U.S. Cl.
CPC ............... *C09D 11/101* (2013.01); *B41J 2/21* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 4,143,013 A | 3/1979 | Jenkinson et al. |
| 5,331,051 A | 7/1994 | Ishibashi et al. |

(Continued)

FOREIGN PATENT DOCUMENTS

| CN | 101305060 A | 11/2008 |
| CN | 101516632 A | 8/2009 |

(Continued)

OTHER PUBLICATIONS

Venkatram et al. "Critical Assessment of the Hildebrand and Hansen Solubility Parameters for Polymer" J. Chem Inf. Model, 2019, 59, 10, pp. 4188-4194, published Sep. 23, 2019.

(Continued)

*Primary Examiner* — Manish S Shah
(74) *Attorney, Agent, or Firm* — Harness, Dickey & Pierce, P.L.C.

(57) ABSTRACT

A radiation-curable ink jet composition includes a polymerizable compound component including a monofunctional monomer component and a multifunctional monomer component, a photopolymerization initiator, and titanium oxide as a white color material. The content of the monofunctional monomer component is 90 mass % or more based on the total amount of the polymerizable compound component, and the weighted average of the glass transition temperatures of homopolymers of the respective polymerizable compounds is 48° C. or more when the mass ratios of the contents of the respective polymerizable compounds are weighted.

10 Claims, 1 Drawing Sheet

(51) Int. Cl.
- *B41M 5/00* (2006.01)
- *B41M 7/00* (2006.01)
- *C09D 11/037* (2014.01)
- *C09D 11/107* (2014.01)
- *C09D 11/322* (2014.01)
- *C09D 11/38* (2014.01)

(52) U.S. Cl.
CPC ........ *B41M 5/0023* (2013.01); *B41M 7/0081* (2013.01); *C09D 11/037* (2013.01); *C09D 11/107* (2013.01); *C09D 11/322* (2013.01); *C09D 11/38* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | |
|---|---|---|---|
| 6,306,502 B1 | 10/2001 | Fukushima et al. | |
| 6,552,102 B2 | 4/2003 | Poetsch et al. | |
| 8,137,793 B2 | 3/2012 | Kameyama et al. | |
| 8,501,830 B2 | 8/2013 | Selman et al. | |
| 8,564,142 B2 | 10/2013 | Ito et al. | |
| 8,940,813 B2 | 1/2015 | Araki et al. | |
| 9,051,481 B2 | 6/2015 | Yoshino et al. | |
| 9,090,636 B2 | 7/2015 | Carpentier et al. | |
| 9,101,955 B2 | 8/2015 | Araki et al. | |
| 9,855,693 B2 | 1/2018 | Umebayashi | |
| 10,308,824 B2 | 6/2019 | Koda et al. | |
| 10,563,075 B2 | 2/2020 | Umebayashi | |
| 10,590,297 B2 | 3/2020 | Nakano et al. | |
| 10,767,068 B2 | 9/2020 | Nakashima et al. | |
| 2004/0010052 A1 | 1/2004 | Ishizuka et al. | |
| 2006/0066697 A1 | 3/2006 | Inoue | |
| 2007/0046719 A1 | 3/2007 | Yamanobe et al. | |
| 2007/0206045 A1* | 9/2007 | Umebayashi | C09D 11/101 347/21 |
| 2007/0259986 A1* | 11/2007 | Elwakil | C09D 11/326 522/83 |
| 2008/0090929 A1 | 4/2008 | Wilson et al. | |
| 2008/0206527 A1 | 8/2008 | Hayata | |
| 2009/0117343 A1 | 5/2009 | Nishida et al. | |
| 2009/0197055 A1 | 8/2009 | Yokoi | |
| 2009/0202795 A1 | 8/2009 | Hayata et al. | |
| 2009/0280265 A1* | 11/2009 | Oyanagi | C09D 11/101 522/14 |
| 2009/0289973 A1 | 11/2009 | Makuta et al. | |
| 2010/0068386 A1 | 3/2010 | Kanbe et al. | |
| 2010/0133728 A1* | 6/2010 | Yonezawa | G03F 7/027 522/182 |
| 2010/0233448 A1 | 9/2010 | Kameyama et al. | |
| 2010/0285282 A1 | 11/2010 | Selman et al. | |
| 2011/0069118 A1 | 3/2011 | Ohzeki et al. | |
| 2011/0171677 A1 | 7/2011 | Braslau | |
| 2011/0223391 A1 | 9/2011 | Nishimura et al. | |
| 2011/0242191 A1 | 10/2011 | Mochizuki | |
| 2012/0113201 A1 | 5/2012 | Kagose et al. | |
| 2012/0133059 A1 | 5/2012 | Ito et al. | |
| 2012/0176456 A1 | 7/2012 | Maekawa et al. | |
| 2012/0189822 A1 | 7/2012 | Ito et al. | |
| 2012/0200653 A1 | 8/2012 | Shimohara et al. | |
| 2012/0229583 A1 | 9/2012 | Fukumoto et al. | |
| 2012/0274717 A1 | 11/2012 | Nakano et al. | |
| 2013/0010039 A1 | 1/2013 | Kida et al. | |
| 2013/0025807 A1 | 1/2013 | Wernersson et al. | |
| 2013/0260092 A1* | 10/2013 | Araki | C09D 11/30 428/137 |
| 2013/0295342 A1 | 11/2013 | Araki et al. | |
| 2014/0022299 A1 | 1/2014 | Yokoi et al. | |
| 2014/0362151 A1 | 12/2014 | Ito et al. | |
| 2014/0370214 A1 | 12/2014 | Araki et al. | |
| 2014/0370250 A1 | 12/2014 | Fujii et al. | |
| 2015/0064398 A1* | 3/2015 | Umebayashi | C09D 11/54 428/137 |
| 2015/0077481 A1 | 3/2015 | Yoshino et al. | |
| 2015/0116425 A1* | 4/2015 | De Meutter | B41J 2/2114 347/40 |
| 2015/0130878 A1* | 5/2015 | Kohzuki | C09D 175/08 347/85 |
| 2015/0240094 A1 | 8/2015 | Kagose et al. | |
| 2015/0291818 A1 | 10/2015 | Kida et al. | |
| 2015/0315396 A1 | 11/2015 | Kida et al. | |
| 2015/0344709 A1 | 12/2015 | Araki | |
| 2015/0344722 A1 | 12/2015 | Lin | |
| 2016/0083604 A1 | 3/2016 | Steert et al. | |
| 2016/0102216 A1 | 4/2016 | Hirade et al. | |
| 2016/0160062 A1 | 6/2016 | Kida et al. | |
| 2016/0222146 A1 | 8/2016 | Yamashita et al. | |
| 2016/0312052 A1 | 10/2016 | Cong et al. | |
| 2017/0058135 A1 | 3/2017 | Kohzuki et al. | |
| 2017/0233594 A1 | 8/2017 | Yoda et al. | |
| 2017/0240659 A1 | 8/2017 | Norcini et al. | |
| 2017/0240754 A1* | 8/2017 | Tsuchiya | B41J 2/01 |
| 2017/0252971 A1* | 9/2017 | Umebayashi | B41M 5/00 |
| 2017/0283631 A1 | 10/2017 | Paul et al. | |
| 2018/0002552 A1 | 1/2018 | Nakano et al. | |
| 2018/0030290 A1 | 2/2018 | Hirose et al. | |
| 2018/0079921 A1 | 3/2018 | Okamoto et al. | |
| 2018/0136559 A1 | 5/2018 | Sakai | |
| 2018/0223117 A1 | 8/2018 | Toeda et al. | |
| 2018/0244933 A1 | 8/2018 | Tsuchiya et al. | |
| 2018/0273778 A1 | 9/2018 | Saito et al. | |
| 2018/0362279 A1 | 12/2018 | Koshida et al. | |
| 2019/0008519 A1 | 1/2019 | Nativ et al. | |
| 2019/0085190 A1 | 3/2019 | De Meutter | |
| 2019/0092957 A1 | 3/2019 | Nakano et al. | |
| 2020/0231830 A1 | 7/2020 | Kobayashi et al. | |
| 2020/0231832 A1 | 7/2020 | Shimizu et al. | |
| 2020/0254784 A1 | 8/2020 | Sato et al. | |
| 2020/0255677 A1 | 8/2020 | Tanaka et al. | |
| 2020/0255678 A1 | 8/2020 | Sekine et al. | |
| 2020/0255679 A1 | 8/2020 | Sekine et al. | |
| 2020/0255682 A1 | 8/2020 | Tanaka et al. | |
| 2020/0270286 A1 | 8/2020 | Miyamoto et al. | |
| 2020/0392353 A1 | 12/2020 | Tanaka et al. | |
| 2020/0392357 A1 | 12/2020 | Sekine et al. | |

(56) References Cited

U.S. PATENT DOCUMENTS

2021/0071024 A1 3/2021 Tanaka et al.
2021/0079242 A1 3/2021 Yoda et al.

FOREIGN PATENT DOCUMENTS

| | | |
|---|---|---|
| CN | 101831214 A | 9/2010 |
| CN | 102558958 A | 7/2012 |
| CN | 102585599 A | 7/2012 |
| CN | 107602776 A | 1/2018 |
| CN | 108624139 A | 10/2018 |
| CN | 108884342 A | 11/2018 |
| CN | 109554018 A | 4/2019 |
| EP | 2471879 A1 | 7/2012 |
| EP | 2502967 A2 | 9/2012 |
| EP | 2 644 664 A1 | 10/2013 |
| EP | 2 653 511 A1 | 10/2013 |
| EP | 2 848 660 A1 | 3/2015 |
| EP | 2842763 A2 | 3/2015 |
| EP | 3222684 A1 | 9/2017 |
| JP | 2006-299117 A | 11/2006 |
| JP | 2006-312711 A | 11/2006 |
| JP | 2007-321034 A | 12/2007 |
| JP | 2008-163080 A | 7/2008 |
| JP | 2008-189887 A | 8/2008 |
| JP | 2008-208190 A | 9/2008 |
| JP | 2008-214395 A | 9/2008 |
| JP | 2009-185186 A | 8/2009 |
| JP | 2009-203287 A | 9/2009 |
| JP | 2010-184996 A | 8/2010 |
| JP | 2010-235914 A | 10/2010 |
| JP | 2011-095602 A | 5/2011 |
| JP | 2011-168735 A | 9/2011 |
| JP | 2011-225824 A | 11/2011 |
| JP | 2012-116928 A | 6/2012 |
| JP | 2012-126885 A | 7/2012 |
| JP | 2012-140550 A | 7/2012 |
| JP | 2012-153853 A | 8/2012 |
| JP | 2012-158672 A | 8/2012 |
| JP | 2012-162688 A | 8/2012 |
| JP | 2012-201815 A | 10/2012 |
| JP | 2013-079383 A | 5/2013 |
| JP | 2013-163740 A | 8/2013 |
| JP | 2013-227515 A | 11/2013 |
| JP | 2013-240978 A | 12/2013 |
| JP | 2013-240980 A | 12/2013 |
| JP | 2014-070135 A | 4/2014 |
| JP | 2014-196414 A | 10/2014 |
| JP | 2014-198748 A | 10/2014 |
| JP | 2014-240153 A | 12/2014 |
| JP | 2015-014009 A | 1/2015 |
| JP | 2015-048387 A | 3/2015 |
| JP | 2015-081284 A | 4/2015 |
| JP | 2015-091662 A | 5/2015 |
| JP | 2015-178609 A | 10/2015 |
| JP | 2015-203051 A | 11/2015 |
| JP | 2015-533897 A | 11/2015 |
| JP | 2015-224340 A | 12/2015 |
| JP | 2016-041820 A | 3/2016 |
| JP | 2016-153498 A | 8/2016 |
| JP | 2016-160274 A | 9/2016 |
| JP | 2017-002187 A | 1/2017 |
| JP | 2017-141382 A | 8/2017 |
| JP | 2017-149825 A | 8/2017 |
| JP | 2017-155181 A | 9/2017 |
| JP | 2017-155190 A | 9/2017 |
| JP | 2018-009142 A | 1/2018 |
| JP | 2018-127527 A | 8/2018 |
| JP | 2018-141101 A | 9/2018 |
| JP | 2018-162375 A | 10/2018 |
| JP | 2019-508534 A | 3/2019 |
| JP | 2019-059807 A | 4/2019 |
| JP | 2019081867 A | 5/2019 |
| JP | 2019-151703 A | 9/2019 |
| JP | 2019151714 A | 9/2019 |
| JP | 2020-519561 A | 7/2020 |
| JP | 2020-117585 A | 8/2020 |
| JP | 2020-117587 A | 8/2020 |
| WO | 2014-051702 A1 | 4/2014 |
| WO | 2015-140538 A1 | 9/2015 |
| WO | 2016-098636 A1 | 6/2016 |

OTHER PUBLICATIONS

G. Jing et al., "Series on 500 Questions About Practical Printing and Packaging Technology", 200 Questions About UV Glazing Process and Technology, Graphic Communications Press, Mar. 5, 2023, with English translation (7 Pages).

* cited by examiner

RADIATION-CURABLE INK JET COMPOSITION AND INK JET METHOD

The present application is based on, and claims priority from JP Application Serial Number 2019-111787, filed Jun. 17, 2019, the disclosure of which is hereby incorporated by reference herein in its entirety.

BACKGROUND

1. Technical Field

The present disclosure relates to a radiation-curable ink jet composition and an ink jet method.

2. Related Art

As described in, for example, JP-A-2018-9142, it has been known that radiation-curable ink jet compositions having less odor and exhibiting good curability and flexibility after curing are obtained by containing 2 to 3 mass % of a color material and containing a vinyl ether group-containing (meth)acrylic acid ester, acryloylmorpholine, etc., and vinylcaprolactam, etc.

However, since a white ink composition is required to have a shielding property, the pigment content thereof is higher than those of other colors in some cases, and there is a problem that the adhesion of an ink coating film decreases with an increase in the content of a pigment. In addition, a white ink containing a large amount of a white color material having a large specific gravity has a problem that when a known ink jet head is used, for example, clogging easily occurs, and the discharge stability is inferior.

SUMMARY

The radiation-curable ink jet composition of the present invention includes a polymerizable compound component including a monofunctional monomer component and a multifunctional monomer component, a photopolymerization initiator, and titanium oxide as a white color material, wherein the content of the monofunctional monomer component is 90 mass % or more based on the total amount of the polymerizable compound component, and the weighted average of the glass transition temperatures of homopolymers of the respective polymerizable compounds is 48° C. or more when the mass ratios of the contents of the respective polymerizable compounds are weighted.

In the radiation-curable ink jet composition, the content of the titanium oxide may be 15 mass % or more based on the total amount of the radiation-curable ink jet composition.

In the radiation-curable ink jet composition, the multifunctional monomer component may include a vinyl ether group-containing (meth)acrylate represented by formula (1):

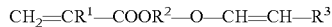

where, $R^1$ is a hydrogen atom or a methyl group, $R^2$ is a divalent C2-C20 organic residue, and $R^3$ is a hydrogen atom or a monovalent C1-C11 organic residue.

In the radiation-curable ink jet composition, the content of the multifunctional monomer component may be 0.10 to 10 mass % based on the total amount of the radiation-curable ink jet composition.

In the radiation-curable ink jet composition, the monofunctional monomer component may include a nitrogen-containing monofunctional monomer component.

In the radiation-curable ink jet composition, the nitrogen-containing monofunctional monomer component may include a monomer having a nitrogen-containing heterocyclic structure.

In the radiation-curable ink jet composition, the monofunctional monomer component may include a monofunctional (meth)acrylate having a crosslinked condensed ring structure.

In the radiation-curable ink jet composition, the monofunctional (meth)acrylate having a crosslinked condensed ring structure may include dicyclopentenyl (meth)acrylate.

In addition, the ink jet method of the present invention uses a liquid jet head including a nozzle discharging the radiation-curable ink jet composition, a pressure chamber to which the radiation-curable ink jet composition is supplied, and a circulation flow passage allowing the radiation-curable ink jet composition in the pressure chamber to circulate, and the method includes a discharging step of discharging the radiation-curable ink jet composition by the liquid jet head to adhere the composition to a recording medium, where the composition is previously heated, and an irradiating step of irradiating the radiation-curable ink jet composition adhered to the recording medium with radioactive rays.

The ink jet method may include a heating step of heating the radiation-curable ink jet composition in the liquid jet head to 40° C. or more.

DESCRIPTION OF EXEMPLARY EMBODIMENTS

Figure 1:
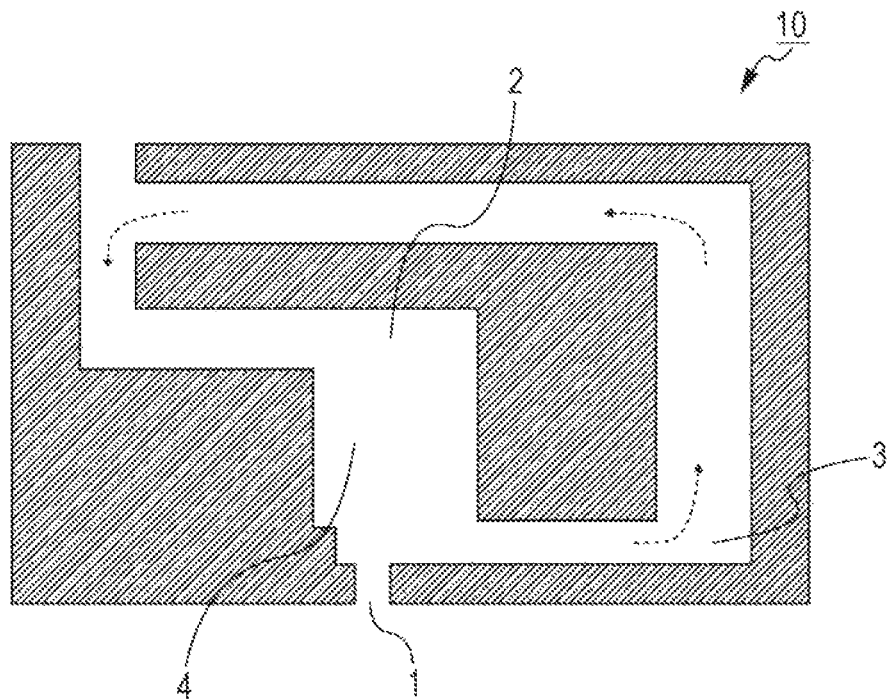
FIG. 1 is a schematic diagram explaining the structure of a liquid jet head that can be used in an embodiment.

Embodiments of the present disclosure (hereinafter, referred to as "the present embodiment") will now be described in detail with reference to the drawings as necessary, but the present disclosure is not limited thereto and can be variously modified within a range not changing the gist of the present disclosure. Incidentally, in the drawings, the same elements are denoted by the same reference numerals, and redundant description is omitted. Furthermore, the positional relationship, such as up and down or right and left, is based on the positional relationship shown in the drawings unless otherwise specified. Furthermore, the dimensional ratios in the drawings are not limited to the illustrated ratios.

In the present specification, the term "(meth)acryloyl" means acryloyl and/or methacryloyl corresponding to the acryloyl. The term "(meth)acrylate" means acrylate and/or methacrylate corresponding to the acrylate. The term "(meth)acryl" means acryl and/or methacryl corresponding to the acryl.

1. Radiation-Curable Ink Jet Composition

The radiation-curable ink jet composition according to the present embodiment (hereinafter, also simply referred to as "composition") includes a polymerizable compound component including a monofunctional monomer component and a multifunctional monomer component, a photopolymerization initiator, and titanium oxide as a white color material, wherein the content of the monofunctional monomer component is 90 mass % or more based on the total amount of the polymerizable compound component, and the weighted average of the glass transition temperatures of homopolymers of the respective polymerizable compounds is 48° C. or more when the mass ratios of the contents of the respective polymerizable compounds are weighted.

Although a white ink composition to be used in, for example, sign application is required to have a shielding property, there is a problem that the adhesion and flexibility of an ink coating film decrease with an increase in the content of a pigment. In contrast to the above, in the present embodiment, the adhesion and flexibility of a coating film can be improved by adjusting the content of the monofunctional monomer component within a predetermined range. Furthermore, although the scratch resistance of a coating film decreases when the content of the monofunctional monomer component is within the above-mentioned range, the scratch resistance of the coating film can also be improved by adjusting the polymerizable compound component such that the weighted average of the glass transition temperatures of homopolymers of the respective polymerizable compounds is within a predetermined range. Consequently, in the present embodiment, the adhesion, flexibility, and scratch resistance of the coating film can be secured, while securing the shielding property, even when titanium oxide, which is inferior in the adhesion with media, is used.

The radiation-curable ink jet composition according to the present embodiment is a composition to be used by being discharged from an ink jet head by an ink jet method. Although a radiation-curable ink composition will now be described as an embodiment of the radiation-curable ink jet composition, the composition according to the present embodiment may be a composition other than ink compositions, such as a composition to be used for 3D molding.

The radiation-curable ink jet composition of the present embodiment is cured by irradiation with radioactive rays. Examples of the radioactive rays include ultraviolet rays, electron rays, infrared rays, visible rays, and X-rays. The radioactive rays may be ultraviolet rays because its radiation source is easily available and widely used and because a material suitable for curing by irradiation with ultraviolet rays is easily available and widely used.

The components and physical properties of the radiation-curable ink jet composition according to the present embodiment and a method for manufacturing the composition will now be described.

1.1. Polymerizable Compound Component

The polymerizable compound component includes a monofunctional monomer component having one polymerizable functional group and a multifunctional monomer component having multiple polymerizable functional groups and may include an oligomer having one or multiple polymerizable functional groups as necessary. The respective polymerizable compounds may be used alone or in combination of two or more thereof.

In the present embodiment, the weighted average of the glass transition temperatures of homopolymers of the respective polymerizable compounds is 48° C. or more when the mass ratios of the contents of the respective polymerizable compounds are weighted and may be 50° C. or more or 52° C. or more. When the weighted average of glass transition temperatures is 48° C. or more, the scratch resistance of the coating film at room temperature can be enhanced. The upper limit of the weighted average of glass transition temperatures is not particularly limited and may be 65° C. or less, 60° C. or less, or 55° C. or less.

A method for calculating the weighted average of glass transition temperatures will be described. In the description, the weighted average value of glass transition temperatures is represented by $Tg_{All}$, the glass transition temperature of a homopolymer of a polymerizable compound is represented by $Tg_N$, and the mass ratio of the content of the polymerizable compound is represented by $X_N$ (mass %), where N is a sequential number starting from 1 according to the types of the polymerizable compounds contained in the radiation-curable ink jet composition. For example, when three types of polymerizable compounds are used, $Tg_1$, $Tg_2$, and $Tg_3$ are generated. The glass transition temperature of a homopolymer of a polymerizable compound can be obtained from the safety data sheet (SDS) or catalog information of the polymerizable compound. The weighted average $Tg_{All}$ of glass transition temperatures is the sum total of the respective products of each glass transition temperature $Tg_N$ calculated for each polymerizable compound and its content mass ratio $X_N$ and is accordingly represented by the following expression (2):

$$Tg_{All} = \Sigma Tg_N \times X_N \qquad (2).$$

Incidentally, the weighted average of glass transition temperatures can be adjusted by the glass transition temperatures of the respective polymerizable compounds to be used and the mass ratios of the contents of the respective polymerizable compounds to be used.

1.1.1. Monofunctional Monomer Component

The monofunctional monomer component of the present embodiment is not particularly limited, and examples of the monofunctional monomer include a nitrogen-containing monofunctional monomer, a monofunctional (meth)acrylate having a crosslinked condensed ring structure, an aromatic group-containing monofunctional monomer, and a saturated aliphatic group-containing monofunctional monomer. The monofunctional monomer component may include another monofunctional monomer as necessary in addition to or instead of these monomers. The optional monofunctional monomer may be any monofunctional monomer and can be a known monofunctional monomer containing a polymerizable functional group, in particular, a polymerizable functional group having an unsaturated carbon double bond.

The content of the monofunctional monomer component is 90 mass % or more based on the total amount of the polymerizable compound component and may be 92 mass % or more or 94 mass % or more. When the content of the monofunctional monomer component is 90 mass % or more based on the total amount of the polymerizable compound component, the flexibility and adhesion of the coating film are further improved. In addition, the upper limit of the content of the monofunctional monomer component is not particularly limited and may be 99 mass % or less, 98 mass % or less, or 97 mass % or less based on the total amount of the polymerizable compound component. When the content of the monofunctional monomer component is 99 mass % or less based on the total amount of the polymerizable compound component, the scratch resistance of the coating film tends to be further improved.

The content of the monofunctional monomer component may be 60 mass % or more, 65 mass % or more, or 67 mass % or more based on the total amount of the composition. When the content of the monofunctional monomer component is 60 mass % or more based on the total amount of the composition, the flexibility and adhesion of the coating film tend to be further improved. In addition, the upper limit of the content of the monofunctional monomer component may be 80 mass % or less, 75 mass % or less, or 73 mass % or less based on the total amount of the composition. When the content of the monofunctional monomer component is 80 mass % or less based on the total amount of the composition, the scratch resistance of the coating film tends to be further improved.

Examples of the monofunctional monomer are shown below, but the monofunctional monomers in the present embodiment are not limited to the following examples.

1.1.1.1. Nitrogen-Containing Monofunctional Monomer

The nitrogen-containing monofunctional monomer is not particularly limited, and examples thereof include nitrogen-containing monofunctional vinyl monomers, such as N-vinylcaprolactam, N-vinylformamide, N-vinylcarbazole, N-vinylacetamide, and N-vinylpyrrolidone; nitrogen-containing monofunctional acrylate monomers, such as acryloylmorpholine; and nitrogen-containing monofunctional acrylamide monomers, such as (meth)acrylamide, N-hydroxymethyl(meth)acrylamide, diacetone acrylamide, N,N-dimethyl(meth)acrylamide, and (meth)acrylamides such as a dimethylaminoethylacrylate benzyl chloride quaternary salt.

In particular, the nitrogen-containing monofunctional monomer component may include either a nitrogen-containing monofunctional vinyl monomer or a nitrogen-containing monofunctional acrylate monomer, or may include a monomer having a nitrogen-containing heterocyclic structure, such as N-vinylcaprolactam, N-vinylcarbazole, N-vinylpyrrolidone, or acryloylmorpholine, or may include either N-vinylcaprolactam or acryloylmorpholine.

The scratch resistance of the coating film tends to be further improved by using such a nitrogen-containing monofunctional monomer component. Furthermore, a nitrogen-containing monofunctional vinyl monomer having a nitrogen-containing heterocyclic structure, such as N-vinylcaprolactam, and a nitrogen-containing monofunctional acrylate monomer having a nitrogen-containing heterocyclic structure, such as acryloylmorpholine, tend to further improve the flexibility and adhesion of the coating film.

The content of the nitrogen-containing monofunctional monomer component may be 8 to 25 mass %, 10 to 20 mass %, or 12 to 18 mass % based on the total amount of the polymerizable compound component. When the content of the nitrogen-containing monofunctional monomer component is within the above-mentioned range, the scratch resistance of the coating film tends to be further improved.

The content of the nitrogen-containing monofunctional monomer component may be 5 to 20 mass %, 8 to 16 mass %, or 10 to 14 mass % based on the total amount of the composition. When the content of the nitrogen-containing monofunctional monomer component is 20 mass % or less based on the total amount of the composition, the adhesion tends to be further improved. In addition, when the content of the nitrogen-containing monofunctional monomer component is 5 mass % or more based on the total amount of the composition, the scratch resistance of the coating film tends to be further improved.

1.1.1.2. Monofunctional (Meth)Acrylate Having Crosslinked Condensed Ring Structure An example of the optional monofunctional monomer is a monofunctional (meth)acrylate having a crosslinked condensed ring structure. In the present disclosure, the term "crosslinked condensed ring structure" means a structure in which two or more ring structures share a side in a one-to-one manner and two or more non-adjacent atoms in a single ring structure or different ring structures are connected to each other. Examples of the monofunctional (meth)acrylate having a crosslinked condensed ring structure include dicyclopentenyl (meth) acrylate, dicyclopentenyloxyethyl (meth)acrylate, and dicyclopentanyl (meth)acrylate. In addition, examples of the crosslinked condensed ring structure include, in addition to the above examples, the following compounds.

In particular, dicyclopentenyl (meth)acrylate may be included. When such a monofunctional (meth)acrylate having a crosslinked condensed ring structure is used, the scratch resistance of the coating film and the flexibility and adhesion of the coating film tend to be further improved.

The content of the monofunctional (meth)acrylate having a crosslinked condensed ring structure may be 1 to 25 mass %, 3 to 20 mass %, or 5 to 15 mass % based on the total amount of the polymerizable compound component. When the content of the monofunctional (meth)acrylate having a crosslinked condensed ring structure based on the total amount of the polymerizable compound component is within the above-mentioned range, the adhesion and scratch resistance of the coating film tend to be further improved.

The content of the monofunctional (meth)acrylate having a crosslinked condensed ring structure may be 15 to 45 mass %, 20 to 40 mass %, or 25 to 35 mass % based on the total amount of the composition. When the content of the monofunctional (meth)acrylate having a crosslinked condensed ring structure based on the total amount of the composition is within the above-mentioned range, the adhesion and scratch resistance of the coating film tend to be further improved.

1.1.1.3. Aromatic Group-Containing Monofunctional Monomer

The aromatic group-containing monofunctional monomer is not particularly limited, and examples thereof include phenoxyethyl (meth)acrylate, benzyl (meth)acrylate, alkoxylated 2-phenoxyethyl (meth) acrylate, ethoxylated nonylphenyl (meth) acrylate, alkoxylated nonylphenyl (meth) acrylate, p-cumylphenol EO-modified (meth) acrylate, and 2-hydroxy-3-phenoxypropyl (meth) acrylate.

In particular, the aromatic group-containing monofunctional monomer may be phenoxyethyl (meth)acrylate or benzyl (meth)acrylate, in particular, phenoxyethyl (meth) acrylate, especially phenoxyethyl acrylate (PEA). When such an aromatic group-containing monofunctional monomer is used, the solubility of a polymerization initiator is further improved, and the curability of the composition tends to be further improved. In particular, when an acylphosphine oxide-based photopolymerization initiator or a thioxanthone-based photopolymerization initiator is used, the solubility tends to be improved.

The content of the aromatic group-containing monofunctional monomer may be 25 to 55 mass %, 30 to 50 mass %, or 35 to 45 mass % based on the total amount of the polymerizable compound component. When the content of the aromatic group-containing monofunctional monomer based on the total amount of the polymerizable compound component is within the above-mentioned range, the adhesion and scratch resistance of the coating film tend to be further improved.

The content of the aromatic group-containing monofunctional monomer may be 15 to 45 mass %, 20 to 40 mass %, or 25 to 35 mass % based on the total amount of the composition. When the content of the aromatic group-containing monofunctional monomer based on the total amount of the composition is within the above-mentioned range, the adhesion and scratch resistance of the coating film tend to be further improved.

1.1.1.4. Saturated Aliphatic Group-Containing Monofunctional Monomer

The saturated aliphatic group-containing monofunctional monomer is not particularly limited, and examples thereof include alicyclic group-containing monofunctional monomers, such as isobornyl (meth)acrylate (IBXA), tert-butylcyclohexanol acrylate (TBCHA), and 2-(meth)acrylic acid-1,4-dioxaspiro[4,5]dec-2-ylmethyl; linear or branched aliphatic group-containing monofunctional monomers, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth) acrylate, isostearyl (meth) acrylate, 2-hydroxybutyl (meth) acrylate, butoxyethyl (meth) acrylate, tetrahydrofurfuryl (meth) acrylate, 2-hydroxyethyl (meth)acrylate, and 2-hydroxypropyl (meth)acrylate; and lactone-modified flexible (meth)acrylate. In particular, the saturated aliphatic group-containing monofunctional monomer may be an alicyclic group-containing monofunctional monomer. The curability of the composition tends to be further improved by using such a saturated aliphatic group-containing monofunctional monomer. Incidentally, in the present embodiment, examples of the saturated aliphatic group-containing monofunctional monomer do not include a compound having a crosslinked condensed ring structure.

The content of the saturated aliphatic group-containing monofunctional monomer may be 1 to 6 mass %, 2 to 5 mass %, or 3 to 4 mass % based on the total amount of the polymerizable compound component.

The content of the saturated aliphatic group-containing monofunctional monomer may be 2 to 8 mass %, 3 to 7 mass %, or 4 to 6 mass % based on the total amount of the composition.

1.1.1.5. Others

In addition to the above, other examples of the optional monofunctional monomer include unsaturated carboxylic acids, such as (meth)acrylic acid, itaconic acid, crotonic acid, isocrotonic acid, and maleic acid; salts of the unsaturated carboxylic acids; unsaturated carboxylic acid esters, urethanes, amides, and anhydrides; acrylonitrile, styrene, various unsaturated polyesters, unsaturated polyethers, unsaturated polyamides, and unsaturated urethanes.

1.1.2. Multifunctional Monomer Component

Examples of the multifunctional monomer of the present embodiment include, but not limited to, vinyl ether group-containing (meth)acrylate and multifunctional (meth) acrylate.

The content of the multifunctional monomer component may be 1 to 10 mass % or more, 2 to 8 mass %, or 3 to 6 mass % based on the total amount of the polymerizable compound component. When the content of the multifunctional monomer component based on the total amount of the polymerizable compound component is 1 mass % or more, the scratch resistance tends to be further improved. In addition, when the content of the multifunctional monomer component based on the total amount of the polymerizable compound component is 10 mass % or less, the flexibility and adhesion of the coating film tend to be further improved.

In addition, the content of the multifunctional monomer component may be 0.1 to 10 mass % or more, 1 to 8 mass %, or 2 to 6 mass % based on the total amount of the composition. When the content of the multifunctional monomer component based on the total amount of the composition is 0.1 mass % or more, the scratch resistance tends to be further improved. In addition, when the content of the multifunctional monomer component based on the total amount of the composition is 10 mass % or less, the flexibility and adhesion of the coating film tend to be further improved.

Examples of the multifunctional monomer are shown below, but the multifunctional monomer in the present embodiment is not limited to the following examples.

1.1.2.1. Vinyl Ether Group-Containing (Meth)Acrylate

The vinyl ether group-containing (meth)acrylate is not particularly limited, and examples thereof include compounds represented by the following formula (1). When such a vinyl ether group-containing (meth)acrylate is included, the viscosity of the composition decreases, and the discharge stability tends to be further improved. In addition, the curability of the composition is further improved, and also the recording speed can be further increased with the improvement of the curability.

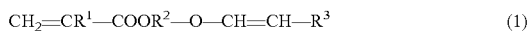

$$CH_2=CR^1-COOR^2-O-CH=CH-R^3 \quad (1)$$

where, $R^1$ is a hydrogen atom or a methyl group, $R^2$ is a divalent C2-C20 organic residue, and $R^3$ is a hydrogen atom or a monovalent C1-C11 organic residue.

In the formula (1), examples of the divalent C2-C20 organic residue represented by $R^2$ include an optionally substituted linear, branched, or cyclic C2-C20 alkylene group, an optionally substituted C2-C20 alkylene group having an oxygen atom forming an ether bond and/or an ester bond in the structure, and an optionally substituted divalent C6-C11 aromatic group. In particular, the divalent C2-C20 organic residue may be a C2-C6 alkylene group, such as an ethylene group, an n-propylene group, an isopropylene group, or a butylene group; or a C2-C9 alkylene group having an oxygen atom forming an ether bond in the structure, such as an oxyethylene group, an oxy-n-propylene group, an oxyisopropylene group, or an oxybutylene group. Furthermore, from the viewpoint of being capable of further reducing the viscosity of the composition and further improving the curability of the composition, the vinyl ether group-containing (meth)acrylate may be a compound having a glycol ether chain, in which $R^2$ is a C2-C9 alkylene group having an oxygen atom forming an ether bond in the structure, such as an oxyethylene group, an oxy-n-propylene group, an oxyisopropylene group, or an oxybutylene group.

In the formula (1), the monovalent C1-C11 organic residue represented by $R^3$ may be an optionally substituted linear, branched, or cyclic C1-C10 alkyl group or an optionally substituted C6-C11 aromatic group. In particular, the monovalent C1-C11 organic residue may be a C1-C2 alkyl group, i.e., a methyl group or an ethyl group or a C6-C8 aromatic group, such as a phenyl group or a benzyl group.

When each of the above-described organic residues is an optionally substituted group, the substituents are divided into groups containing carbon atoms and groups not containing carbon atoms. When the substituent is a group containing a carbon atom, the carbon atom is counted as the carbon atom of the organic residue. Examples of the group containing a carbon atom include, but not limited to, a carboxyl group and an alkoxy group. When the substituent is a group not containing a carbon atom, examples thereof include, but not limited to, a hydroxy group and a halo group.

Examples of the compound represented by the formula (1) include, but not limited to, 2-vinyloxyethyl (meth) acrylate, 3-vinyloxypropyl (meth) acrylate, 1-methyl-2-vinyloxyethyl (meth) acrylate, 2-vinyloxypropyl (meth) acrylate, 4-vinyloxybutyl (meth) acrylate, 1-methyl-3-vinyloxypropyl (meth) acrylate, 1-vinyloxymethylpropyl (meth) acrylate, 2-methyl-3-vinyloxypropyl (meth)acrylatel, 1,1-dimethyl-2-vinyloxyethyl (meth) acrylate, 3-vinyloxybutyl (meth)acrylate, 1-methyl-2-vinyloxypropyl (meth)acrylate, 2-vinyloxybutyl (meth) acrylate, 4-vinyloxycyclohexyl (meth)acrylate, 6-vinyloxyhexyl (meth)acrylate, 4-vinyloxymethylcyclohexylmethyl (meth) acrylate, 3-vinyloxymethylcyclohexylmethyl (meth) acrylate, 2-vinyloxymethylcyclohexylmethyl (meth) acrylate, p-vinyloxymethylphenylmethyl (meth) acrylate, m-vinyloxymethylphenylmethyl (meth) acrylate, o-vinyloxymethylphenylmethyl (meth) acrylate, 2-(2-vinyloxyethoxy)ethyl (meth) acrylate, 2-(vinyloxyisopropoxy) ethyl (meth) acrylate, 2-(vinyloxyethoxy) propyl (meth) acrylate, 2-(vinyloxyethoxy) isopropyl (meth) acrylate, 2-(vinyloxyisopropoxy) propyl (meth) acrylate, 2-(vinyloxyisopropoxy) isopropyl (meth) acrylate, 2-(vinyloxyethoxyethoxy) ethyl (meth) acrylate, 2-(vinyloxyethoxyisopropoxy) ethyl (meth) acrylate, 2-(vinyloxyisopropoxyethoxy) ethyl (meth) acrylate, 2-(vinyloxyisopropoxyisopropoxy)ethyl (meth) acrylate, 2-(vinyloxyethoxyethoxy) propyl (meth) acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth) acrylate, 2-(vinyloxyethoxyethoxy) isopropyl (meth)acrylate, 2-(vinyloxyethoxyisopropoxy)isopropyl (meth) acrylate, 2-(vinyloxyisopropoxyethoxy)isopropyl (meth) acrylate, 2-(vinyloxyisopropoxyisopropoxy)isopropyl (meth) acrylate, 2-(vinyloxyethoxyethoxyethoxy)ethyl (meth) acrylate, 2-(vinyloxyethoxyethoxyethoxyethoxy)ethyl (meth) acrylate, 2-(isopropenoxyethoxy)ethyl (meth) acrylate, 2-(isopropenoxyethoxyethoxy)ethyl (meth) acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate. Among these examples, in particular, the compound may be 2-(2-vinyloxyethoxy)ethyl acrylate because it is easy to balance between the curability and the viscosity of the composition. Incidentally, in the present embodiment, 2-(2-vinyloxyethoxy)ethyl acrylate may also be referred to as VEEA.

The content of the vinyl ether group-containing (meth) acrylate may be 1 to 10 mass % or more, 2 to 8 mass %, or 3 to 6 mass % based on the total amount of the polymerizable compound component. When the content of the vinyl ether group-containing (meth)acrylate based on the total amount of the polymerizable compound component is within the above-mentioned range, the viscosity of the composition decreases, and the discharge stability tends to be further improved.

The content of the vinyl ether group-containing (meth) acrylate may be 0.1 to 10 mass % or more, 1 to 8 mass %, or 2 to 6 mass % based on the total amount of the composition. When the content of the vinyl ether group-containing (meth)acrylate based on the total amount of the composition is within the above-mentioned range, the viscosity of the composition decreases, and the discharge stability tends to be further improved.

1.1.2.2. Multifunctional (Meth)Acrylate

The multifunctional (meth)acrylate is not particularly limited, and examples thereof include difunctional (meth) acrylates, such as dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol di(meth) acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth) acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, and polytetramethylene glycol di(meth)acrylate; and tri- or higher multifunctional (meth)acrylates, such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactone-modified dipentaerythritol hexa(meth)acrylate.

The content of the multifunctional (meth)acrylate may be 1 to 10 mass % or more, 2 to 8 mass %, or 3 to 6 mass % based on the total amount of the polymerizable compound component. When the content of the multifunctional (meth) acrylate based on the total amount of the polymerizable compound component is 1 mass % or more, the scratch resistance tends to be further improved. In addition, the content of the multifunctional (meth)acrylate based on the total amount of the polymerizable compound component is 10 mass % or less, the flexibility and adhesion of the coating film tend to be further improved.

In addition, the content of the multifunctional (meth) acrylate may be 0.1 to 10 mass % or more, 1 to 8 mass %, or 2 to 6 mass % based on the total amount of the composition. When the content of the multifunctional (meth) acrylate based on the total amount of the composition is 0.1 mass % or more, the scratch resistance tends to be further improved. In addition, when the content of the multifunctional (meth)acrylate based on the total amount of the composition is 10 mass % or less, the flexibility and adhesion of the coating film tend to be further improved.

1.2. Photopolymerization Initiator

The photopolymerization initiator may be any initiator that generates an active species by irradiation with radioactive rays, and examples thereof include known photopolymerization initiators, such as an acylphosphine oxide-based photopolymerization initiator, an alkylphenone-based polymerization initiator, a titanocene-based polymerization initiator, and a thioxanthone-based photopolymerization initiator. In particular, the initiator may be an acylphosphine oxide-based photopolymerization initiator. The use of such a photopolymerization initiator further improves the curability of the composition and tends to further improve the curability in the curing process by, in particular, light from a UV-LED. The photopolymerization initiators may be used alone or in combination of two or more thereof.

The acylphosphine oxide-based photopolymerization initiator is not particularly limited, and examples thereof include 2,4,6-trimethylbenzoyl diphenylphosphine oxide, bis(2,4,6-trimethylbenzoyl)-phenylphosphine oxide, and bis(2,6-dimethoxybenzoyl)-2,4,4-trimethylpentylphosphine oxide.

Examples of commercial products of the acylphosphine oxide-based photopolymerization initiator include IRGACURE 819 (bis(2,4,6-trimethylbenzoyl)-phenylphosphine oxide), IRGACURE 1800 (a mixture of bis(2,6-dimethoxybenzoyl)-2,4,4-trimethylpentylphosphine oxide and 1-hydroxy-cyclohexyl-phenylketone at a mass ratio of 25:75), and IRGACURE TPO (2,4,6-trimethylbenzoyl diphenylphosphine oxide) (these products are all manufactured by BASF SE).

The content of the photopolymerization initiator may be 3 to 12 mass %, 5 to 10 mass %, or 7 to 9 mass % based on the total amount of the composition. When the content of the photopolymerization initiator is within the above-mentioned range, the curability of the composition and the solubility of the photopolymerization initiator tend to be further improved.

1.3. White Color Material

The radiation-curable ink jet composition of the present embodiment contains titanium oxide as a white color material. Titanium oxide tends to decrease the adhesion of the coating film but has a high shielding property due to its high whiteness and high refractive index compared to other white color materials such as silica.

The content of titanium oxide may be 5 mass % or more, 10 mass % or more, or 15 mass % or more based on the total amount of the composition. When the content of titanium oxide is 5 mass % or more, the shielding property tends to be further improved. In addition, the content of titanium oxide may be 30 mass % or less, 25 mass % or less, or mass % or less based on the total amount of the composition. When the content of titanium oxide is 30 mass % or less, the adhesion, scratch resistance, and flexibility of the coating film tend to be further improved.

1.4. Other Additives

The radiation-curable ink jet composition according to the present embodiment may further contain additives, such as a dispersant, a polymerization inhibitor, and a slipping agent, as necessary.

1.4.1. Dispersant

The radiation-curable ink jet composition of the present embodiment may further include a dispersant for further improving the dispersibility of the white color material. As the dispersant, a single dispersant may be used, or two or more dispersants may be used.

The dispersant is not particularly limited, and examples thereof include dispersants that are commonly used for preparing pigment dispersions, such as polymer dispersants. Specifically, examples thereof include those whose main component is at least one selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins.

Examples of commercial products of the polymer dispersant include AJISPER series manufactured by Ajinomoto Fine-Techno Co., Ltd., Solsperse series (such as Solsperse 36000) available from Avecia or Noveon, Inc., DISPERBYK series manufactured by BYK Additives & Instruments, and DISPARLON series manufactured by Kusumoto Chemicals, Ltd.

The content of the dispersant may be 0.1 to 2 mass %, 0.1 to 1 mass %, or 0.1 to 0.5 mass % based on the total amount of the composition.

1.4.2. Polymerization Inhibitor

The radiation-curable ink jet composition according to the present embodiment may further contain a polymerization inhibitor. As the polymerization inhibitor, a single polymerization inhibitor may be used, or two or more polymerization inhibitors may be used.

Examples of the polymerization inhibitor include, but not limited to, p-methoxyphenol, hydroquinone methyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds.

The content of the polymerization inhibitor may be 0.05 to 1 mass % or 0.05 to 0.5 mass % based on the total amount of the composition.

1.4.3. Slipping Agent

The radiation-curable ink jet composition according to the present embodiment may further include a slipping agent. As the slipping agent, a single slipping agent may be used, or two or more slipping agents may be used.

The slipping agent may be a silicone surfactant, in particular, polyester-modified silicone or polyether-modified silicone. Examples of the polyester-modified silicone include BYK-347, 348, BYK-UV 3500, 3510, and 3530 (these products are all manufactured by BYK Additives & Instruments). Examples of the polyether-modified silicone include BYK-3570 (manufactured by BYK Additives & Instruments).

The content of the slipping agent may be 0.01 to 2 mass % or 0.05 to 1 mass % based on the total amount of the composition.

1.5. Physical Properties

The viscosity at 40° C. of the radiation-curable ink jet composition according to the present embodiment is 10 mPa·s or more and may be 10 to 15 mPa·s or 10 to 14 mPa·s. When the composition has a viscosity at 40° C. within the above-mentioned range, the discharge stability is further improved. Incidentally, the viscosity can be measured using a viscoelastometer MCR-300 (manufactured by Pysica) in an environment of 40° C. by increasing the shear rate from 10 to 1000 and reading the viscosity at a shear rate of 200. Alternatively, the viscosity at 40° C. may be estimated from the viscosities measured in environments of 35° C. and 45° C.

1.6. Method for Manufacturing Composition

The radiation-curable ink jet composition is manufactured (prepared) by mixing the respective components to be contained in the composition and sufficiently stirring the mixture until uniform. In the present embodiment, the preparation of the radiation-curable ink jet composition may include a step of subjecting a mixture of a polymerization initiator and at least a prat of monomers to ultrasonication and/or warming treatment in the preparation process. Consequently, the amount of dissolved oxygen in the prepared composition can be decreased, and the radiation-curable ink jet composition can have excellent discharge stability and storage stability. The mixture may further include other components of the radiation-curable ink jet composition, as long as the above-mentioned components are included, or may contain all components of the radiation-curable ink jet composition. The monomer component included in the mixture may be at least part of the monomers of the radiation-curable ink jet composition.

2. Ink Jet Method

The ink jet method according to the present embodiment includes a discharge step of discharging a prescribed radiation-curable ink jet composition (hereinafter, also simply referred to as "composition") with a prescribed liquid jet head to adhere the composition to a recording medium and an irradiation step of irradiating the radiation-curable ink jet composition adhered to the recording medium with radioactive rays.

The ink jet method according to the present embodiment can provide a good shielding property, as described above, by using an ink composition including titanium oxide as a white color material. However, since titanium oxide has a large specific gravity, when a known acyclic type liquid jet head is used, clogging or the like easily occurs, and the discharge stability tends to be poor.

In contrast, in the ink jet method according to the present embodiment, a cyclic type liquid jet head is used to circulate the ink composition containing titanium oxide in the head, and as a result, the discharge stability can be maintained.

In addition, in the ink jet method according to the present embodiment, the flexibility, adhesion, and scratch resistance can be improved by using a composition in which the ratio of the monofunctional monomer component is high and the weighted average of glass transition temperatures of polymerizable compounds is high. However, such a composition tends to have an increased viscosity. Accordingly, from the viewpoint of allowing the composition to be discharged by a liquid jet head, it is required to reduce the viscosity to a predetermined value or less by heating the composition to a higher temperature than before. However, the temperature difference between the temperature in the vicinity of the liquid jet head and the environmental temperature increases as the heating temperature is raised. On this occasion, when an acyclic type liquid jet head is used, the heat radiation conditions of the respective nozzles differ from one another by the differences in the duty cycles (discharge duties) of the nozzles discharging the composition and the differences of the positions (such as the center and the edges) of the nozzles in the head. Accordingly, the variation in the temperature of the composition to be discharged becomes large, resulting in occurrence of a problem of a reduction in discharge stability.

In contrast to the above, in the ink jet method according to the present embodiment, the flexibility, adhesion, and scratch resistance, which are original characteristics of the composition, can be simultaneously achieved, while maintaining the discharge stability by stabilizing the above-described variation in the temperature, by using a cyclic type liquid jet head. Each step will now be described in detail.

2.1. Discharge Step

In the discharge step, a heated composition is discharged from a liquid jet head and adheres to a recording medium. More specifically, a pressure-generating unit is driven to discharge the composition filling a pressure-generating chamber of the liquid jet head from a nozzle. This discharge method is also referred to as an ink jet method.

A liquid jet head used in the present embodiment will be described. FIG. 1 is a schematic diagram explaining the structure of a liquid jet head 10. FIG. 1 shows outlines of one nozzle 1 discharging a composition, a pressure chamber 2 to which the composition is supplied, and a circulation flow passage 3 allowing the composition in the pressure chamber 2 to circulate. In the example of FIG. 1, the nozzle 1 and the pressure chamber 2 are communicated with each other via a communication passage 4.

The nozzle 1 is a through hole for discharging the composition. More specifically, the nozzle 1 is a through hole formed in a nozzle plate. A plurality of nozzles is formed in the nozzle plate, and the pressure chamber 2 is disposed for each of the nozzles. The pressure chamber 2 is individually formed for each nozzle 1. The composition is supplied to the pressure chamber 2. When the pressure in the pressure chamber 2 is changed by means of the pressure-generating unit (not shown), part of the composition flowing in the communication passage 4 is jetted from the nozzle 1 to the outside, and part of the remaining composition flows into the circulation flow passage 3. The route of the circulation flow passage 3 is not particularly limited, and the flow passage can be configured such that the composition flowed into the circulation flow passage 3 is supplied to the pressure chamber 2. The composition flowed into the circulation flow passage 3 need not necessarily be re-supplied to the same pressure chamber and may be supplied to a pressure chamber corresponding to another nozzle. In addition, the whole flow passage of the circulation flow passage 3 need not be present inside the liquid jet head 10, and the flow passage may be partially outside the liquid jet head 10 as long as the flow passage is configured such that the composition flowed out from the pressure chamber 2 is supplied to the pressure chamber 2 again.

Thus, according to the liquid jet head 10 of the present embodiment, it is possible to efficiently circulate the composition in the pressure chamber 2, more specifically, the composition in the vicinity of the nozzle 1, within the head. Consequently, even if there are differences in the duty cycles of the respective nozzles or the positions of the nozzles, the variations in the temperature of the composition in the respective nozzles can be suppressed.

Examples of the liquid jet head 10 that is used in the discharge step include line heads that perform recording by a line system and serial heads that perform recording by a serial system.

In the line system using a line head, for example, a liquid jet head having a width not narrower than the recording width of a recording medium is fixed to an ink jet apparatus. A recording medium is moved along the sub scanning direction (the vertical direction or the transportation direction of the recording medium), and an ink droplet is discharged from a nozzle of the liquid jet head in conjunction with the movement to record an image on the recording medium.

In the serial system using a serial head, for example, a liquid jet head is mounted on a carriage that is movable in the width direction of a recording medium. The carriage is moved along the main scanning direction (the horizontal direction or the width direction of the recording medium), and an ink droplet is discharged from a nozzle opening of the head in conjunction with the movement to record an image on the recording medium.

2.2. Heating Step

The ink jet method of the present embodiment may include a heating step of heating the composition in the liquid jet head. More specifically, the ink jet method may include a heating step of heating the composition in the circulation flow passage constituted of the pressure chamber 2, the circulation flow passage 3, and the communication passage 4. The heating means is not particularly limited and may be disposed in, for example, the pressure chamber 2, the circulation flow passage 3, or the communication passage 4. In addition, a heating means for heating the nozzle plate may be additionally disposed, or when the circulation flow passage 3 goes through the outside the liquid jet head 10, a heating means may be disposed in the circulation flow passage 3 in the outside of the liquid jet head 10. Furthermore, a heating means may be disposed in the ink flow passage upstream of the pressure chamber. Here, the term "ink flow passage" refers to a flow passage for distributing an ink. For example, an ink supply channel for supplying an ink from an ink container for storing the ink to the ink jet recording head is also included in the ink flow passage.

As the heating temperature of the composition, the lower limit may be 35° C. or more, 40° C. or more, or 45° C. or more, and the upper limit may be 70° C. or less, 60° C. or less, or 50° C. or less. The variation in the temperature of the composition can be suppressed by combining such a heating step and a liquid jet head for circulating the composition.

2.3. Irradiation Step

In the irradiation step, the radiation-curable ink jet composition adhered to the recording medium is irradiated with radioactive rays. Polymerization of monomers is initiated by the irradiation with radioactive rays to cure the composition, resulting in formation of a coating film. On this occasion, if a polymerization initiator is present, active species (initiating species), such as radicals, acids, or bases, are generated, and the polymerization of monomers is promoted by the function of the initiating species. In addition, if a photosensitizer is present, the photosensitizer absorbs radioactive rays to become an excited state and comes into contact with the polymerization initiator to promote the decomposition of the polymerization initiator. Consequently, it is possible to further achieve the curing reaction.

Here, examples of the radioactive rays include ultraviolet rays, infrared rays, visible rays, and X-rays. A radiation source is disposed downstream the liquid jet head and irradiates the composition with the radioactive rays. The radiation source is not particularly limited, and examples thereof include an ultraviolet light-emitting diode. The use of such a radiation source can achieve downsizing the apparatus and a reduction in cost. Since the ultraviolet light-emitting diode as an ultraviolet ray source is small sized, it can be attached to the inside of the ink jet apparatus.

For example, the ultraviolet light-emitting diode can be attached to the carriage (both ends along the medium width direction and/or the medium transporting direction side) on which the liquid jet head that discharges the radiation-curable ink jet composition is mounted. Furthermore, curing can be achieved with low energy at a high speed due to the above-described composition of the radiation-curable ink jet composition. The irradiation energy is calculated by multiplying the irradiation time by the irradiation intensity. Accordingly, the irradiation time can be shortened, and the printing speed is increased. Alternatively, the irradiation intensity can also be decreased. Consequently, an increase in the temperature of printed matter can be decreased, which also leads to a decrease in the odor of the cured film.

3. Ink Jet Apparatus

The ink jet apparatus of the present embodiment includes a liquid jet head including a nozzle discharging a composition, a pressure chamber to which the composition is supplied, and a circulation flow passage allowing the composition in the pressure chamber to circulate; a heating unit capable of heating the composition; and a radiation source irradiating the composition with radioactive rays, wherein the above-described radiation-curable ink jet composition is used as the composition.

The liquid jet head includes, as shown in FIG. 1, a nozzle 1, a pressure chamber 2 to which a composition is supplied, and a circulation flow passage 3 allowing the composition in the pressure chamber 2 to circulate. The heating unit may be disposed at any position, as long as it is possible to heat the composition in the pressure chamber 2 and the circulation flow passage including the circulation flow passage 3, and can be disposed in, for example, the liquid jet head or in the ink flow passage. When the heating unit is disposed in the liquid jet head, the heating unit may be disposed in either the pressure chamber or the circulation flow passage. In the ink jet apparatus of the present embodiment, the radiation-curable ink jet composition may be that filling the ink flow passage or the ink tank.

Figure 2:
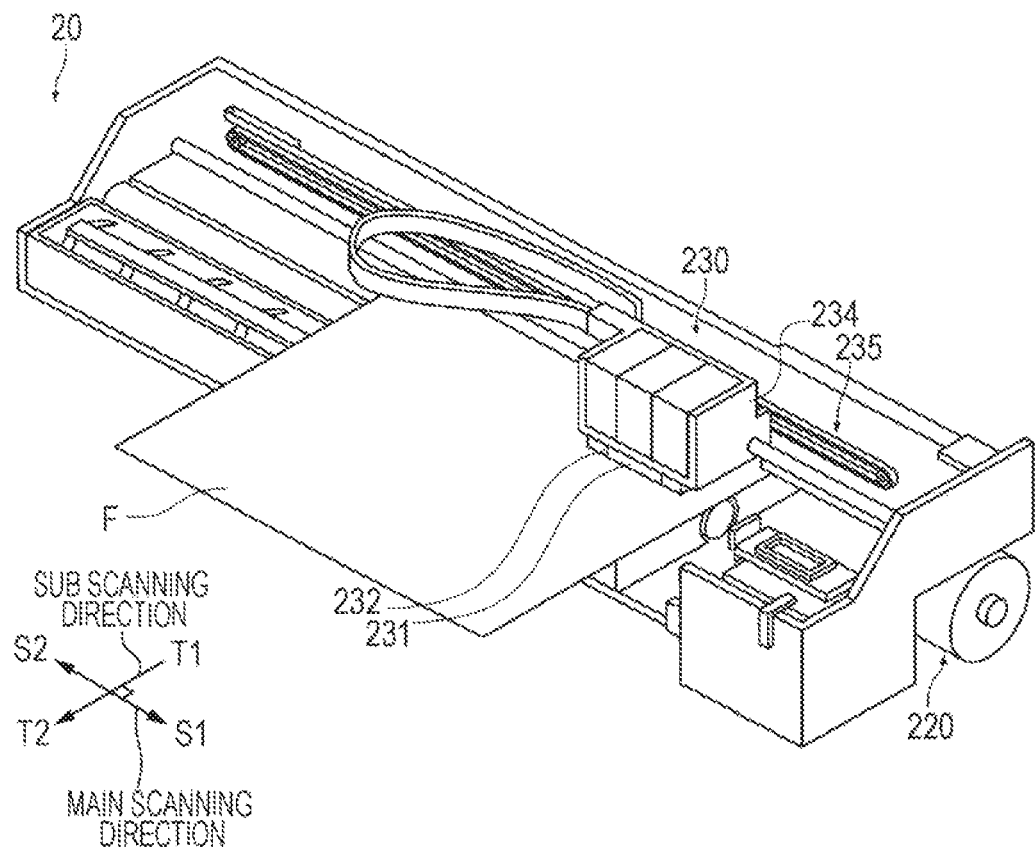
FIG. 2 is a perspective view illustrating an ink jet apparatus of a serial system of an embodiment.

As an example of the ink jet apparatus, a perspective view of a serial printer is shown in FIG. 2. As shown in FIG. 2, the serial printer 20 includes a transportation unit 220 and a recording unit 230. The transportation unit 220 transports a recording medium F fed to the serial printer to the recording unit 230 and ejects the recording medium after recording to the outside of the serial printer. Specifically, the transportation unit 220 includes feed rollers and transports the fed recording medium F to the sub-scanning direction T1.

The recording unit 230 includes an ink jet head 231 that discharges a composition to a recording medium F fed from the transportation unit 220; a radiation source 232 that irradiates the adhered composition with radioactive rays; a carriage 234 on which the ink jet head 231 and the radiation source 232 are mounted; and a carriage moving mechanism 235 for moving the carriage 234 to the main scanning direction S1, S2 of the recording medium F.

A serial printer includes a head having a length smaller than the width of a recording medium as the ink jet head 131. The head moves to perform recording by a plurality of passes (multi-pass). In the serial printer, the head 231 and the radiation source 232 are mounted on the carriage 234 that moves in a predetermined direction, and the head moves as the carriage moves and discharges a composition onto a recording medium. Consequently, recording is performed by two or more passes (multi-pass). Incidentally, the pass is also called main scanning. Sub-scanning for transporting a recording medium is performed between passes. That is, main scanning and sub-scanning are alternately performed.

Incidentally, FIG. 2 shows an aspect in which the radiation source is mounted on the carriage. However, the printer is not limited to this and may include a radiation source not mounted on the carriage.

In addition, the ink jet apparatus of the present embodiment is not limited to the printer of a serial system and may be a printer of the above-described line system.

4. Recorded Matter

The recorded matter of the present embodiment is made of the radiation-curable ink jet composition adhered on a recording medium and cured thereon. Since the composition has good flexibility and adhesion, cracking and chipping of the coating film can be prevented during post processing, such as cutting and bending. Accordingly, the recorded matter of the present embodiment can be used in, for example, sign application.

The material of the recording medium is not particularly limited, and examples thereof include plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polystyrene, and polyvinylacetal, and these plastics whose surfaces are processed; glass; paper; metals; and wood.

In addition, the recording medium may have any shape. Examples of the shape include a film, a board, and cloth.

EXAMPLES

The present disclosure will now be more specifically described by examples but is not limited to the following examples.

1. Preparation of Ink Jet Composition

A color material, a dispersant, and a part of each monomer were weighed and put in a pigment dispersion tank of a bead mill, ceramic beads with a diameter of 1 mm were put in the tank, and stirring was performed to prepare a pigment dispersion in which the color material was dispersed in the monomer. Subsequently, the remaining monomers, a polymerization initiator, and a polymerization inhibitor were put in a mixture tank made of stainless steel to give the composition shown in Table 1 and were mixed and stirred to be completely dissolved. The pigment dispersion prepared above was then added to the mixture tank, followed by further mixing and stirring at an ordinary temperature for 1 hour and further filtration through a membrane filter having a pore size of 5 μm to obtain the radiation-curable ink jet composition of each example. Incidentally, the numerical value of each component of each example shown in the table represents mass % unless otherwise specified.

TABLE 1

| | | Tg (° C.) | Example | | | | | | | | | | | Comparative Example | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 1 | 2 | 3 | 4 |
| Composition (mass %) | | | | | | | | | | | | | | | | | | |
| Monofunctional monomer component | PEA | −22 | 34.6 | 30.1 | 32.0 | 24.2 | 27.7 | 28.3 | 24.2 | 28.0 | 32.0 | 32.0 | 29.0 | 32.2 | 31.7 | 41.2 | 30.1 |
| | NVC | 90 | 0.0 | 0.0 | 0.0 | 12.0 | 4.0 | 0.0 | 0.0 | 0.0 | 0.0 | 0.0 | 0.0 | 9.0 | 0.0 | 0.0 | 0.0 |
| | ACMO | 145 | 11.0 | 12.0 | 12.0 | 0.0 | 8.0 | 8.0 | 12.0 | 12.0 | 12.0 | 12.0 | 8.0 | 20.0 | 0.0 | 12.0 | 12.0 |
| | TBCHA | 38 | 3.6 | 0.0 | 0.0 | 0.0 | 0.0 | 0.0 | 0.0 | 0.0 | 0.0 | 0.0 | 0.0 | 0.0 | 4.5 | 0.0 | 0.0 |
| | IBXA | 94 | 0.0 | 24.1 | 20.2 | 24.0 | 24.0 | 26.9 | 24.0 | 20.2 | 20.2 | 27.2 | 20.2 | 0.0 | 25.0 | 29.0 | 24.1 |
| | DCPA | 110 | 23.0 | 4.0 | 6.0 | 10.0 | 6.5 | 7.0 | 10.0 | 6.0 | 6.0 | 6.0 | 6.0 | 0.0 | 9.0 | 6.0 | 4.0 |
| Multifunctional monomer component | VEEA | 39 | 1.0 | 3.0 | 3.0 | 3.0 | 3.0 | 3.0 | 3.0 | 7.0 | 0.0 | 4.0 | 3.0 | 12.0 | 3.0 | 3.0 | 3.0 |
| | DPGDA | 104 | 0.0 | 0.0 | 0.0 | 0.0 | 0.0 | 0.0 | 0.0 | 0.0 | 3.0 | 0.0 | 0.0 | 0.0 | 0.0 | 0.0 | 0.0 |
| Polymerization initiator | Irg.819 | — | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | TPO | — | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Polymerization inhibitor | MEHQ | — | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Slipping agent | BYK-UV3500 | — | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| White color material | Titanium oxide | — | 18.0 | 18.0 | 18.0 | 18.0 | 18.0 | 18.0 | 18.0 | 18.0 | 18.0 | 10.0 | 25.0 | 18.0 | 18.0 | 0.0 | 0.0 |
| | Silica particle | — | 0.0 | 0.0 | 0.0 | 0.0 | 0.0 | 0.0 | 0.0 | 0.0 | 0.0 | 0.0 | 0.0 | 0.0 | 0.0 | 0.0 | 18.0 |
| Dispersant | solsperse 36000 | — | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Total | | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Physical property | | | | | | | | | | | | | | | | | | |
| Proportion of monofunctional monomer component to polymerizable compound component | | | 98.6 | 95.9 | 95.9 | 95.9 | 95.9 | 95.9 | 95.9 | 90.4 | 95.9 | 95.1 | 95.5 | 83.6 | 95.9 | 96.7 | 95.9 |
| Weighted average temperature (° C.) of glass transition temperatures | | | 48 | 53 | 51 | 55 | 55 | 54 | 64 | 54 | 53 | 54 | 48 | 47 | 40 | 48 | 53 |
| Viscosity (mPa · s) at 40° C. | | | 12.9 | 10.2 | 10.2 | 10.5 | 10.3 | 10.2 | 11.3 | 10 | 13.4 | 10.4 | 14 | 8.8 | 9.5 | 9.5 | 10.2 |
| Evaluation item | | | | | | | | | | | | | | | | | | |
| | Curability | | C | B | B | B | B | B | B | A | C | B | A | A | B | B | B |
| | Shielding property | | A | A | A | A | A | A | A | A | A | C | A | A | A | E | D |
| | Flexibility | | A | A | A | A | A | B | A | B | A | C | D | A | A | A | A |
| | Adhesion | | A | A | A | A | A | B | A | B | A | A | C | D | A | A | A |
| | Scratch resistance | | B | B | A | A | B | B | A | A | B | B | C | C | D | B | B |
| Discharge stability | Cyclic head (heated at 45° C.) | | A | A | A | A | A | A | A | A | B | A | B | A | A | A | A |
| | Acyclic head (heated at 45° C.) | | C | B | B | B | B | B | C | B | C | A | C | A | B | A | A |

The abbreviations and product components shown in Table 1 are as follows.

Monofunctional Monomer

PEA (trade name: "Viscoat #192", manufactured by Osaka Organic Chemical Industry Ltd., phenoxyethyl acrylate)

NVC (manufactured by ISP Japan Ltd., N-vinylcaprolactam)

ACMO (manufactured by KJ Chemicals Corporation, acryloylmorpholine)

TBCHA (trade name: "SR217", manufactured by Sartomer, tert-butylcyclohexanol acrylate)

IBXA (manufactured by Osaka Organic Chemical Industry Ltd., isobornyl acrylate)

DCPA (manufactured by Hitachi Chemical Co., Ltd., dicyclopentenyl acrylate) Multifunctional monomer VEEA (manufactured by Nippon Shokubai Co., Ltd., 2-(2-vinyloxyethoxy) ethyl acrylate)

DPGDA (trade name: "SR508", manufactured by Sartomer, dipropylene glycol diacrylate) Polymerization initiator Irg. 819 (trade name: "IRGACURE 819", manufactured by BASF SE, bis(2,4,6-trimethylbenzoyl)-phenylphosphine oxide)

TPO (trade name: "IRGACURE TPO", manufactured by BASF SE, 2,4,6-trimethylbenzoyl diphenylphosphine oxide) Polymerization inhibitor MEHQ (trade name: "p-Methoxyphenol", manufactured by Kanto Chemical Co., Inc., hydroquinone monomethyl ether) Slipping agent BYK-UV 3500 (manufactured by BYK Additives & Instruments, polyether-modified polydimethylsiloxane having an acryloyl group) Color material (pigment)

Titanium oxide (trade name: "C.I. Pigment White 6", manufactured by Tayca Corporation)

Silica particles (colloidal silica) used were prepared by classifying commercially available colloidal silica as necessary to give a volume average particle diameter of 90 nm.

Dispersant

Solsperse 36000 (manufactured by The Lubrizol Corporation, polymer dispersant)

In Table 1, "Proportion of monofunctional monomer component to polymerizable compound component" in the physical property column refers to the content of the monofunctional monomer component based on the total amount of the polymerizable compound component. The polymerizable compound component specifically refers to the monofunctional monomer component and the multifunctional monomer component in Table 1.

In Table 1, "Weighted average temperature (° C.) of glass transition temperatures" in the physical property column refers to the weighted average of glass transition temperatures of homopolymers of the respective polymerizable compounds when the mass ratios of the contents of the respective polymerizable compounds are weighted.

In Table 1, the "Viscosity (mPa·s) at 40° C." in the physical property column was measured using a viscoelastometer MCR-300 (manufactured by Pysica) in an environment of 40° C. by increasing the shear rate from 10 to 1000 and reading the viscosity at a shear rate of 200.

2. Evaluation Method 2.1. Evaluation of Curability

Cotton swab-weighted tacking properties were evaluated. Specifically, each radiation-curable ink jet composition was applied onto respective PVC media with a bar coater such that the thickness of the coating film of the ink jet composition was 10 μm and was irradiated with ultraviolet rays at a predetermined irradiation intensity at a rate of 0.04 sec/cm. On this occasion, as the light source, LEDs having a peak wavelength of 395 nm were used. Subsequently, the coating film surface was rubbed with a cotton swab, and the curability was evaluated based on the irradiation intensity at which the swab was not stained. The evaluation criteria are as follows:

A: the irradiation intensity is less than 0.5 W/cm$^2$,

B: the irradiation intensity is 0.5 W/cm$^2$ or more and less than 1.1 W/cm$^2$, C: the irradiation intensity is 1.1 W/cm$^2$ or more and less than 2.5 W/cm$^2$, and D: the irradiation intensity is 2.5 W/cm$^2$ or more.

2.2. Evaluation of Shielding Property

An ink composition prepared as in above was filled in an ink jet printer (trade name: "PX-G930", manufactured by Seiko Epson Corporation). An image made of the ink composition was formed on a film (trade name: "Clear Proof Film", manufactured by Seiko Epson Corporation, cut to the size A4). As the printing pattern of the image, a fill pattern capable of being printed at a resolution of 720 dpi in the horizontal direction and 720 dpi in the vertical direction and at a duty of 100% was formed.

Regarding the image prepared as in above, the amount of transmission light from a wavelength of 380 nm to 800 nm was accumulated using a multi-angle colorimeter (trade name: "ARM-500V", manufactured by JASCO Corporation) to determine the shielding property. The evaluation criteria are as follows:

A: less than 300,
B: 300 or more and less than 350,
C: 350 or more and less than 400,
D: 400 or more and less than 500, and
E: 500 or more.

2.3. Evaluation of Flexibility

Each radiation-curable ink jet composition was applied onto a vinyl chloride film (JT5829R, manufactured by MACtac LLC) with a bar coater such that the coating thickness was 10 μm, and was then cured using a metal halide lamp (manufactured by Eye Graphics Co., Ltd.) at an energy of 400 mJ/cm$^2$ to form a coating film. The vinyl chloride film as release paper on which the coating film was formed was peeled off, and the coating film was cut into a strip shape having a width of 1 cm and a length of 8 cm to prepare a test piece. The elongation percentage as the flexibility of each test piece was measured using a tension tester (TENSILON, manufactured by ORIENTEC Corporation). The elongation percentage was the value at the time when a crack occurred by pulling the test piece at 5 mm/min. The value was calculated by [(length at cracking)−(length before elongation)]/(length before elongation)×100. The evaluation criteria are shown below.

Evaluation Criteria

A: 300% or more,
B: 250% or more and less than 300%,
C: 200% or more and less than 250%,
D: 100% or more and less than 200%, and
E: less than 100%.

2.4. Evaluation of Adhesion

Cured coating films were produced on respective films as in the evaluation of flexibility except that a polypropylene board (manufactured by Coroplast A/S) and a polyethylene terephthalate film (manufactured by Toray Industries, Inc.) were used as the recording media. The resulting coating films were subjected to evaluation by a cross-cut test in accordance with JIS K5600-5-6.

More specifically, a cutting tool (cutter) was placed on a coating film such that the blade of the cutting tool was perpendicular to the coating film, and a grid of 10×10 squares was made by cutting at a distance of 1 mm between cuts. Transparent adhesive tape (width: 25 mm) with a length of about 75 mm was attached to the grid and was sufficiently rubbed with a finger so that the cured film could be seen through the tape. Subsequently, within 5 minutes after the adhesion, the tape was reliably peeled off from the cured film at an angle of approximately 60° for 0.5 to 1.0 seconds, and the condition of the grid was visually verified. The evaluation criteria are as follows:

Evaluation Criteria

A: no peeling of the cured film was observed in the grid in both the polypropylene film and the polyethylene terephthalate film, B: peeling of the cured film was observed in less than 50% of the grid in one of the polypropylene film and the polyethylene terephthalate film, C: peeling of the cured film was observed in less than 50% of the grid in each of the polypropylene film and the polyethylene terephthalate film, D: peeling of the cured film was observed in 50% or more of the grid in one of the polypropylene film and the polyethylene terephthalate film, and E: peeling of the cured film was observed in 50% or more of the grid in each of the polypropylene film and the polyethylene terephthalate film.

2.5. Evaluation of Scratch Resistance

The cured coating films produced in the evaluation of flexibility were evaluated by a micro-scratch test in accordance with JIS R3255. In the measurement, the withstand load as scratch resistance was measured using a nano-layer scratch tester (CSR-5000, manufactured by Nanotec Corporation). Microscratching was performed while applying a load, and the load when a probe reached the surface of a medium was defined as the withstand load. A higher withstand load means more excellent scratch resistance. In the measurement, the probe stylus diameter was 15 µm, the amplitude was 100 µm, and the scratching rate was 10 µm/sec. The evaluation criteria are as follows:

Evaluation Criteria

A: 30 mN/cm$^2$ or more,
B: 25 mN/cm$^2$ or more and less than 30 mN/cm$^2$,
C: 20 mN/cm$^2$ or more and less than 25 mN/cm$^2$, and
D: less than 20 mN/cm$^2$.

2.6. Discharge Stability

The ink compositions of Examples and Comparative Examples were evaluated for the discharge stability as the reliability of an ink jet apparatus (printer). An ink jet printer PX-G930 (Seiko Epson Corporation) on which a cyclic head was mounted and an ink jet printer PX-G930 (Seiko Epson Corporation) on which an acyclic head not having any circulation flow passage was mounted were prepared. More specifically, as the cyclic head, the cyclic head shown in FIG. 2 or 5 of JP-A-2018-103602 was used.

The respective ink jet printers ware filled with each ink composition to set the ink compositions to the above-mentioned printers. Subsequently, the temperature of each head was adjusted to 45° C., and different multiple test patterns were continuously printed for 1 hour under outside environmental temperature of 25° C. to verify the occurrence of defective discharge, such as non-discharge, in the nozzles of each head. The proportion of the number of nozzles in which defective discharge occurred to the total number of the nozzles performed discharge was evaluated according to the following criteria:

Evaluation Criteria

A: less than 1% of nozzles had defective discharge,
B: 1% or more and less than 3% of nozzles had defective discharge,
C: 3% or more and less than 5% of nozzles had defective discharge, and
D: 5% or more of nozzles had defective discharge.

3. Evaluation Results

The compositions of the radiation-curable ink jet compositions used in each example and the results of evaluation are shown in Table 1. As shown in Table 1, in the radiation-curable ink jet compositions of Examples 1 to 11, in which titanium oxide was contained as the white color material, the content of the monofunctional monomer component was 90 mass % or more based on the total amount of the polymerizable compound component, and the weighted average of the glass transition temperatures of homopolymers of the respective polymerizable compounds was 48° C. or more when the mass ratios of the contents of the respective polymerizable compounds were weighted, the results of evaluation of the shielding property, flexibility, adhesion, and scratch resistance were all good.

For details, comparison of each Example with Comparative Example 1 demonstrates that the flexibility and the adhesion are improved when the proportion of the monofunctional monomers to the whole monomers is 90 mass % or more. In addition, comparison of each Example with Comparative Example 2 demonstrates that the scratch resistance is further improved when the weighted average of glass transition temperatures is 48° C. or more. Furthermore, comparison of each Example with Comparative Example 3 demonstrates that when the white color material is not contained, a problem of reducing the flexibility and the adhesion does not occur. In addition, in Comparative Example 3, no shielding property was observed. Furthermore, comparison of each Example with Comparative Example 4 demonstrates that when silica, which is a white color material other than titanium oxide, is used, the shielding property is insufficient.

In addition, the evaluation of discharge stability of each Example demonstrates that when a cyclic head is used, the discharge stability of the composition of the present embodiment having flexibility, adhesion, and scratch resistance is further improved compared when an acyclic head is used.

The cyclic head used in Examples of the present disclosure includes a communication passage 4 and generates a circulation flow by the pressure for ejecting the composition, but the cyclic head may be a type of generating a circulation flow by means of a difference in pressure due to, for example, a difference in water load in the route of the circulation flow passage 3. Alternatively, the cyclic head may be a type of directly connecting between the pressure chamber 2 and the nozzle 1 without having a communication passage 4. Even if such a cyclic head is used, results similar to those in Examples can be obtained.

Although the composition is heated by heating the liquid jet head itself in Examples of the present disclosure, for example, when the circulation flow passage goes through outside the head, the same effect can be obtained by heating the circulation flow passage outside the head, even if the head is not heated, as long as the composition in the circulation flow passage can be heated.

What is claimed is:

1. A radiation-curable ink jet composition comprising:
    a polymerizable compound component including a monofunctional monomer component and a multifunctional monomer component;
    a photopolymerization initiator; and
    titanium oxide as a white color material, wherein
    a content of the monofunctional monomer component is 90 mass % or more based on the total amount of the polymerizable compound component; and
    a weighted average of glass transition temperatures of homopolymers of the respective polymerizable compounds is 48° C. or more and 65° C. or less when mass ratios of contents of the respective polymerizable compounds are weighted.

2. The radiation-curable ink jet composition according to claim 1, wherein
    a content of the titanium oxide is 15 mass % or more based on the total amount of the radiation-curable ink jet composition.

3. The radiation-curable ink jet composition according to claim 1, wherein
    the multifunctional monomer component includes a vinyl ether group-containing (meth)acrylate represented by formula (1):

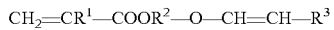

$$CH_2=CR^1-COOR^2-O-CH=CH-R^3$$

where, $R^1$ is a hydrogen atom or a methyl group, $R^2$ is a divalent C2-C20 organic residue, and $R^3$ is a hydrogen atom or a monovalent C1-C11 organic residue.

4. The radiation-curable ink jet composition according to claim 1, wherein
    a content of the multifunctional monomer component is 0.10 to 10 mass % based on the total amount of the radiation-curable ink jet composition.

5. The radiation-curable ink jet composition according to claim 1, wherein
    the monofunctional monomer component includes a nitrogen-containing monofunctional monomer component.

6. The radiation-curable ink jet composition according to claim 5, wherein
the nitrogen-containing monofunctional monomer component includes a monomer having a nitrogen-containing heterocyclic structure.

7. The radiation-curable ink jet composition according to claim 1, wherein
the monofunctional monomer component includes a monofunctional (meth)acrylate having a crosslinked condensed ring structure.

8. The radiation-curable ink jet composition according to claim 7, wherein
the monofunctional (meth)acrylate having a crosslinked condensed ring structure includes dicyclopentenyl (meth)acrylate.

9. An ink jet method using a liquid jet head that includes a nozzle for discharging the radiation-curable ink jet composition according to claim 1, a pressure chamber to which the radiation-curable ink jet composition is supplied, and a circulation flow passage allowing the radiation-curable ink jet composition in the pressure chamber to circulate, the method comprising:
a discharging step of discharging the radiation-curable ink jet composition by the liquid jet head to adhere the composition to a recording medium, where the composition is previously heated; and
an irradiating step of irradiating the radiation-curable ink jet composition adhered to the recording medium with radioactive rays.

10. The ink jet method according to claim 9, comprising:
a heating step of heating the radiation-curable ink jet composition in the liquid jet head to 40° C. or more.

* * * * *